(12) United States Patent
Kaminski et al.

(10) Patent No.: US 11,593,119 B2
(45) Date of Patent: Feb. 28, 2023

(54) AUTONOMOUS DRIVING CONTROLLER PARALLEL PROCESSOR BOOT ORDER

(71) Applicant: Tesla, Inc., Austin, TX (US)

(72) Inventors: Patryk Kaminski, Austin, TX (US); Thaddeus Fortenberry, Dripping Springs, TX (US); David Glasco, Austin, TX (US)

(73) Assignee: Tesla, Inc., Austin, TX (US)

( * ) Notice: Subject to any disclaimer, the term of this patent is extended or adjusted under 35 U.S.C. 154(b) by 739 days.

(21) Appl. No.: 16/388,541

(22) Filed: Apr. 18, 2019

(65) Prior Publication Data

US 2019/0332390 A1 Oct. 31, 2019

Related U.S. Application Data

(60) Provisional application No. 62/663,498, filed on Apr. 27, 2018.

(51) Int. Cl.
*G06F 9/4401* (2018.01)
*B60R 16/023* (2006.01)
*G05D 1/00* (2006.01)

(52) U.S. Cl.
CPC .......... *G06F 9/4405* (2013.01); *B60R 16/023* (2013.01); *G05D 1/0055* (2013.01); *G05D 1/0088* (2013.01); *G05D 2201/0213* (2013.01)

(58) Field of Classification Search
CPC ... G06F 9/4403; G06F 9/4405; B60R 13/023; G05D 1/0055; G05D 1/0088; G05D 2201/0213
USPC .................................................. 710/2; 713/2
See application file for complete search history.

(56) References Cited

U.S. PATENT DOCUMENTS

| | | | | |
|---|---|---|---|---|
| 9,529,601 | B1* | 12/2016 | Dharmadhikari ... | G06F 9/44505 |
| 10,089,116 | B2* | 10/2018 | Valasek ................ | G06F 9/4403 |
| 10,311,236 | B2* | 6/2019 | Nadarajah ............ | G06F 9/4405 |
| 11,005,649 | B2* | 5/2021 | Fortenberry ......... | B60W 50/02 |
| 2008/0229092 | A1* | 9/2008 | Dale .................... | G06F 21/575 |
| | | | | 713/2 |
| 2015/0294116 | A1* | 10/2015 | Gundam .............. | G06F 21/575 |
| | | | | 726/1 |
| 2018/0370540 | A1* | 12/2018 | Yousuf ................. | G06F 11/182 |
| 2019/0101923 | A1* | 4/2019 | Sun ...................... | B25J 9/1664 |
| 2019/0258251 | A1* | 8/2019 | Ditty .................... | G06V 20/58 |
| 2019/0332815 | A1* | 10/2019 | Kaminski ............. | H04L 9/0897 |
| 2019/0332816 | A1* | 10/2019 | Glasco ................. | G06F 21/606 |
| 2020/0175169 | A1* | 6/2020 | Pillilli ................... | G06F 21/575 |
| 2020/0264895 | A1* | 8/2020 | Ma ....................... | G06F 9/4411 |

* cited by examiner

*Primary Examiner* — Brian T Misiura
(74) *Attorney, Agent, or Firm* — Knobbe, Martens, Olson & Bear, LLP

(57) ABSTRACT

An autonomous driving controller includes a plurality of parallel processors operating on common input data. Each of the plurality of parallel processors includes a general processor, a security processor subsystem (SCS), and a safety subsystem (SMS). The general processors, the SCSs, and the SMSs of the plurality of parallel processors are configured to first, boot the plurality of SCSs from ROM second, boot the plurality of SMSs of the plurality of parallel processors from RAM or ROM, and, third, boot the plurality of general processors of the plurality of parallel processors from RAM. Between booting of the SCSs and the SMSs, at least one of the plurality of SCSs may load SMS boot code into the RAM that is dedicated to the plurality of SMSs.

10 Claims, 10 Drawing Sheets

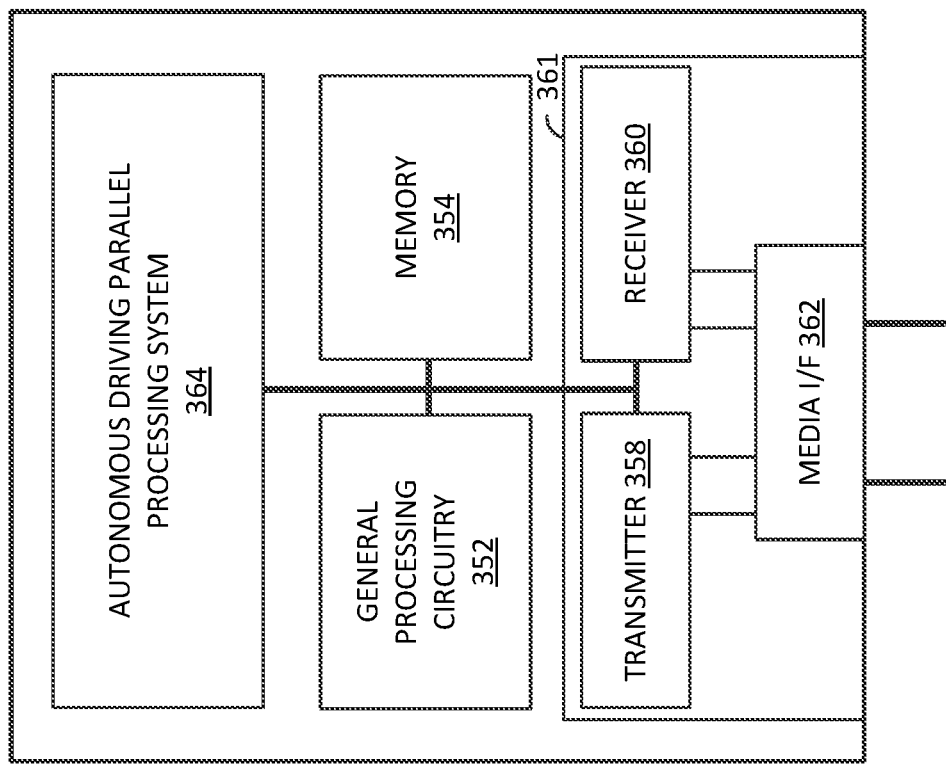
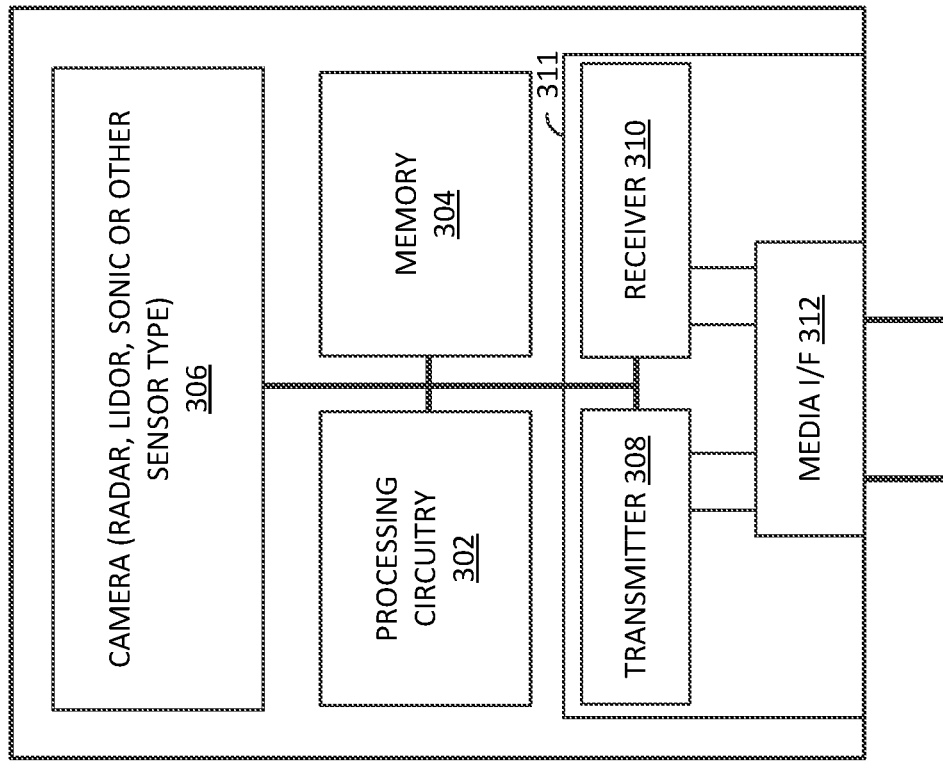
FIG. 3B
FIG. 3A

AUTONOMOUS DRIVING CONTROLLER PARALLEL PROCESSOR BOOT ORDER

CROSS-REFERENCE TO RELATED APPLICATIONS

The present U.S. Utility Patent Application claims priority pursuant to 35 U.S.C. § 119(e) to U.S. Provisional Application No. 62/663,498, entitled "AUTONOMOUS DRIVING CONTROLLER PARALLEL PROCESSOR BOOT ORDER", filed Ape. 27, 2018, which is hereby incorporated herein by reference in its entirety and made part of the present U.S. Utility Patent Application for all purposes.

BACKGROUND

Technical Field

The present disclosure relates to the autonomous driving of a vehicle; and more particularly to an autonomous driving controller parallel processing system.

Description of the Related Art

Self-driving vehicles are generally known to include a plurality of sensors, e.g., RADAR sensors, and LIDOR sensors, cameras, and sonic proximity detectors, among other types of data capturing components. The data captured by these sensors is communicated to a central processor, which processes the data to assist in making autonomous driving decisions, e.g., braking, accelerating, steering changes, etc. Such autonomous driving decisions may be performed while the vehicle is self-driving or when the driver of the vehicle is being assisted, e.g., emergency braking, driver notification, etc.

In order to ensure that the autonomous driving system is fault tolerant, an autonomous driving controller typically includes multiple processors that operate in parallel on common input data, e.g., data received from the sensors, driver input data, extra-vehicular input data, etc., to support autonomous driving operations. The parallel processors should be fully functional and in agreement to support autonomous driving functions. When one (or more) of the parallel processors is compromised, autonomous driving operations are typically terminated. However, because the autonomous driving system is part of a larger communication system, e.g., intra-vehicular, extra-vehicular, and inter-vehicular, for example, there is a risk that the parallel processors could be operationally modified or controlled in an undesirable manner, particularly at startup or reset.

SUMMARY

According to a first embodiment of the present disclosure, a method for booting an autonomous driving controller that includes a plurality of parallel processors includes, in the following order, booting a plurality of security processor subsystems (SCSs) of the plurality of parallel processors from Read Only Memory (ROM) dedicated to the plurality of SCSs. The method next includes booting a plurality of safety processor subsystems (SMSs) of the plurality of parallel processors. The method then includes booting a plurality of general processors of the plurality of parallel processors.

By booting the components of the parallel processors in this order the security and safety of the autonomous driving controller is enhanced and resistant to malicious attacks that may occur at startup or reset. Particularly, by booting the SCS first, the SMS second, and the general processors third, any malicious software that may be present in the general processors' software will not affect startup or reset booting of the SCSs and the SMSs.

According to a first aspect of the first embodiment, booting the plurality of SMSs of the plurality of parallel processors includes booting the plurality of SMSs from ROM dedicated to the plurality of SMSs. According to a second aspect of the first embodiment, booting the plurality of SMSs of the plurality of parallel processors includes booting the plurality of SMSs from flash Random Access Memory (RAM) dedicated to the plurality of SMSs. These differing techniques provide differing benefits. Booting the SMSs from ROM ensures that the SMS boot code that was programmed at provisioning is unaltered. However, booting the SMSs from RAM allows the SCSs to determine what SMS boot code is used to boot the SMSs. With this second scenario, after the booting of the plurality of SCSs and prior to the booting of the plurality of SMSs, at least one SCS controls loading of SMS boot code to the RAM dedicated to the plurality of SMSs.

According to another aspect of the first embodiment, after the booting of the plurality of SCSs and prior to the booting of the plurality of SMSs, the SCSs establish SCS encrypted communications among the plurality of SCSs. The SCS encrypted communications are then used to verify successful booting of the plurality of SCSs using the SCS encrypted communications. Likewise, after the booting of the plurality of SMSs and prior to the booting of the plurality of general processors, the SMSs establish SMS encrypted communications among the plurality of SMSs that is used to verifying successful booting of the plurality of SMSs.

According to a second embodiment of the present disclosure, an autonomous driving controller for a vehicular autonomous driving system that has a plurality of autonomous driving sensors, the autonomous driving controller includes a plurality of parallel processors that operate on common input data received from the plurality of autonomous driving sensors. The plurality of parallel processors includes, respectively, a plurality of general processors, a plurality of SCSs, and a plurality of SMSs. These components are configured to first, boot the plurality of SCSs from ROM dedicated to the plurality of SCSs, second, boot the plurality of SMSs, and third, boot the plurality of general processors. This embodiment provides same/similar benefits as were discussed with reference to the first embodiment.

According to a first aspect of the second embodiment, he plurality of general processors, the plurality of SCSs, and the plurality of SMSs are configured to boot the plurality of SMSs from ROM dedicated to the plurality of SMSs. According to another aspect of the second embodiment, the plurality of general processors, the plurality of SCSs, and the plurality of SMSs are configured to boot the plurality of SMSs from flash RAM dedicated to the plurality of SMSs.

According to another aspect of the second embodiment, the plurality of general processors, the plurality of SCSs, and the plurality of SMSs are configured to, after the booting of the plurality of SCSs and prior to the booting of the plurality of SMSs, have at least one SCS write SMS boot code to the RAM dedicated to the plurality of SMSs.

Further, according to still another aspect of the second embodiment, the plurality of general processors, the plurality of SCSs, and the plurality of SMSs are configured to, after the booting of the plurality of SCSs and prior to the booting of the plurality of SMSs establish SCS encrypted communications among the plurality of SCSs and verify, by at least one SCS, successful booting of the plurality of SCSs using the SCS encrypted communications.

According to yet another aspect of the second embodiment, the plurality of general processors, the plurality of SCSs, and the plurality of SMSs are configured to, after the booting of the plurality of SMSs and prior to the booting of the plurality of general processors establish SMS encrypted communications among the plurality of SMSs and verify, by at least one SMS, successful booting of the plurality of SMSs using the SMS encrypted communications.

Benefits of the disclosed embodiments will become apparent from reading the detailed description below with reference to the drawings.

BRIEF DESCRIPTION OF THE SEVERAL VIEWS OF THE DRAWINGS

FIG. 3A is a block diagram illustrating an autonomous driving sensor constructed according to a described embodiment.

FIG. 3B is a block diagram illustrating an autonomous driving controller constructed according to a described embodiment.

DETAILED DESCRIPTION OF THE DISCLOSURE

Figure 1A:
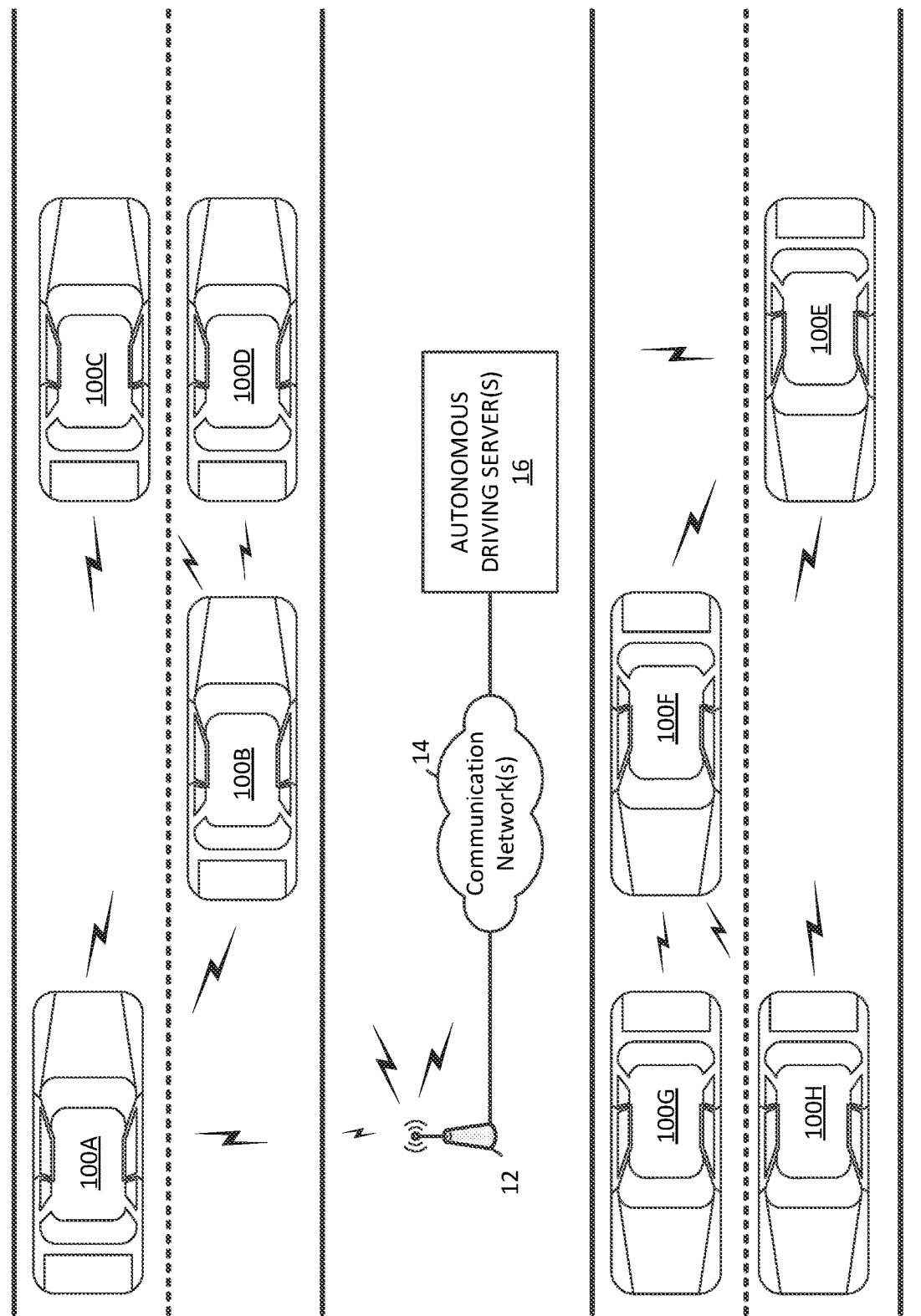
FIG. 1A is a diagram illustrating a group of vehicles, at least one of which is constructed and operates according to a described embodiment to support autonomous driving.

FIG. 1A is a diagram illustrating a group of vehicles, at least one of which is constructed and operates according to a described embodiment to support autonomous driving. Vehicles 100A-110D are traveling in a first direction and vehicles 100E-110H are traveling in a second direction. At least some of these vehicles 100A-100H support autonomous driving according to one or more embodiments described subsequently herein. The vehicles 100A-100H support intra-vehicular communications, extra-vehicular communications, and inter-vehicular communications. Intra-vehicular communications occur within a particular vehicle. Extra-vehicular communications occur between a vehicle and one or more devices external to the vehicle, e.g., between vehicle 100A and wireless access point 12, e.g., cellular base station, WiFi access point, or another wireless device. An example of such extra-vehicular communications is those between the vehicle 100A and an autonomous driving server 16 via communication network 14. These communications may relate to current autonomous driving data/situations or may include data gathered by the vehicle 100A for subsequent use by the autonomous driving server 16.

Inter-vehicular communications are a sub-set of extra-vehicular communications and are communications between two or more vehicles, e.g., 100A, 100B, 100C and 100F. These communications may relate to autonomous driving, e.g., identifying other vehicle, data exchange, vehicle driving warnings, etc. The inter-vehicular communications may be direct communications between vehicles, e.g., between vehicles 100A and 100C, or indirect communications that are relayed by wireless access point 12, either directly or via the communication network 14, the autonomous driving server, or another server. Because the vehicles 100A-110H support a wide variety of operations, they are potentially susceptible to unwanted and undesirable communications. In a particularly bad scenario, while a vehicle, e.g., 100F, is driving autonomously, it may receive a malicious communication from another vehicle, e.g., 100E or via the wireless access point 12, falsely notifying the vehicle 100F of an impending crash or other autonomous driving event. In response to this malicious communication, the vehicle 100E may automatically take a defensive maneuver that does cause a crash or near crash. Of course, this type of event is very undesirable. While it is desirable, from an autonomous driving standpoint, to receive as much input data as possible to make good autonomous driving decisions, there must be a safeguard in place to protect the vehicle 100E from malicious communications.

Thus, according to the present disclosure, a vehicle, e.g., 100E, includes an autonomous driving controller having a plurality of parallel processors that operate in parallel on common input data received from a plurality of autonomous driving sensors. Each of the plurality of parallel processors includes a general processor and a security processor subsystem (SCS), and communication circuitry configured to support communications between the plurality of parallel processors, including communications between the general processors of the plurality of parallel processors and communications between the SCSs of the plurality of parallel processors that are protected by SCS cryptography. Each of the plurality of parallel processors also includes a safety processor subsystem (SMS), with the communication circuitry also configured to support communications between the SMSs of the plurality of parallel processors that are protected by SMS cryptography that differs from the SCS cryptography. This communication cryptography supported by the SCS, the SMS, and the communication circuitry resists malicious communications that would otherwise compromise the autonomous driving system. The autonomous driving controller may include dedicated hardware and/or storage of the SCS and/or SMS to service the communication cryptography.

According to another aspect of the present disclosure, a specific boot order of the components of the plurality of parallel processors is performed to safeguard that the components are correctly configured to resist malicious intervention and to ensure that the components function correctly. According to this aspect of the present disclosure, the SCSs are booted first, the SMSs are booted second, and the general processors are booted third. As will be described further herein, additional safeguards may be included in this boot sequence to provide additional resistance to malicious intervention and robustness of operation.

Figure 1B:
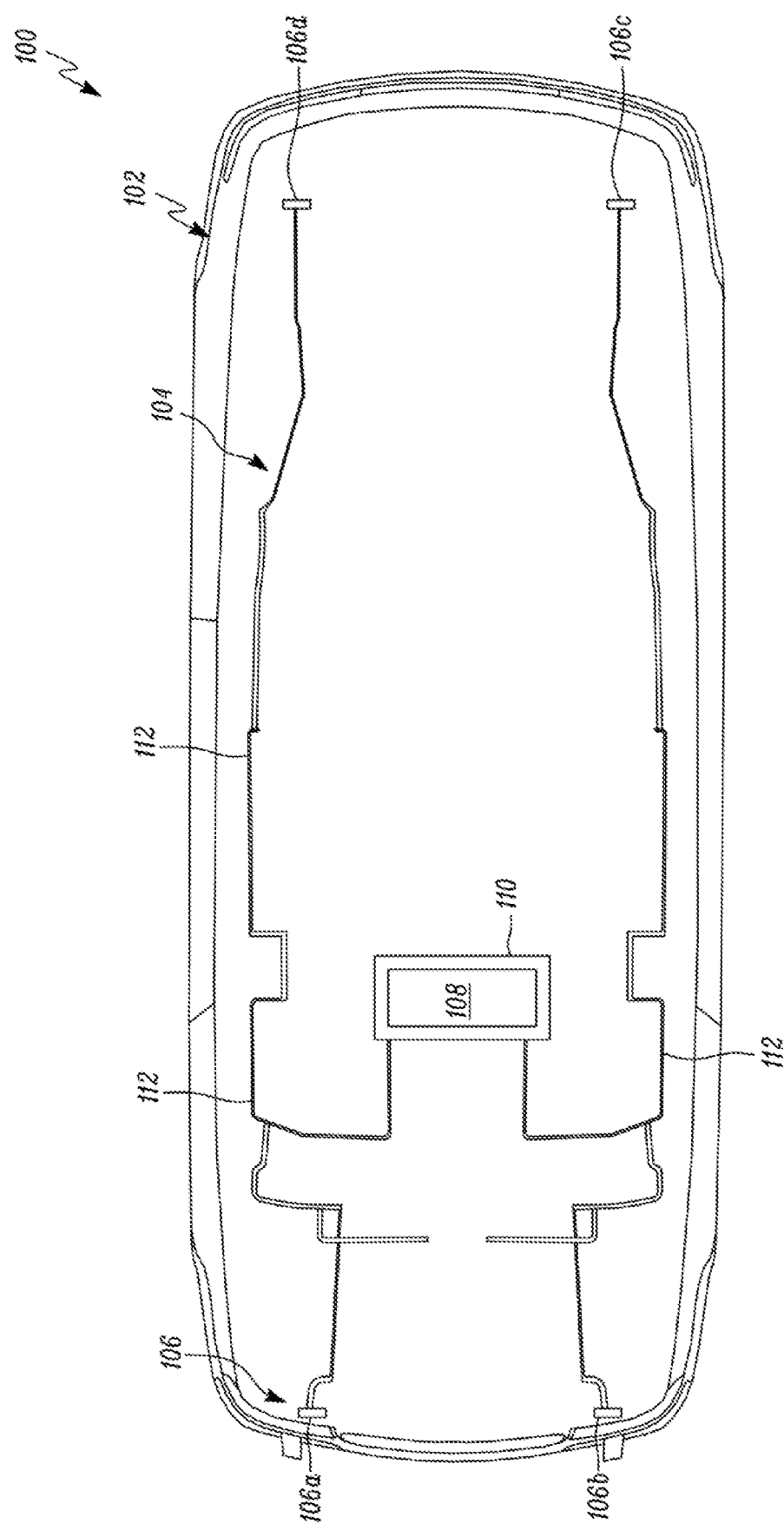
FIG. 1B is a diagram illustrating a vehicle that is constructed and operates according to a described embodiment to support autonomous driving.

FIG. 1B is a diagram illustrating a vehicle that is constructed and operates according to a described embodiment to support autonomous driving. The vehicle 100 includes an autonomous driving controller 108 has a body 102 and a wiring system 104 for connecting a plurality of autonomous driving sensors 106 having individual sensors 106a-106d to an autonomous driving controller 108. The wiring system 104 of FIG. 1B is a structural cable 112. The autonomous driving controller 108 may reside on or in or be co-located with an infotainment device 110. The infotainment device 110 may be used to control functions of various components present in the vehicle 100, e.g., to take over control of a steering function associated with a steering system (not shown) of the vehicle 100, a braking function, an acceleration function, or another function of the vehicle 100 related to autonomous driving or collision prevention. These operations of the infotainment device 110 are performed based upon interaction with the autonomous driving controller 108.

The autonomous driving sensors 106a-106d include cameras, RADAR sensors, LIDAR sensors, sonic proximity sensors, or other sensors that collect information relevant to the operation of the vehicle 100. For example, autonomous driving sensors 106a, 106b could be cameras while autonomous driving sensors 106c, 106d could be RADAR sensors. The autonomous driving sensors 106a-106d are communicatively connected to the autonomous driving controller 108 via the structural cable 112. The structural cable 112 may include a single conductor or a pair of conductors and may be twisted pair wiring, coaxial wiring, single conductor wiring, a power bus or wiring, strip wiring, or other wiring.

Figure 2:
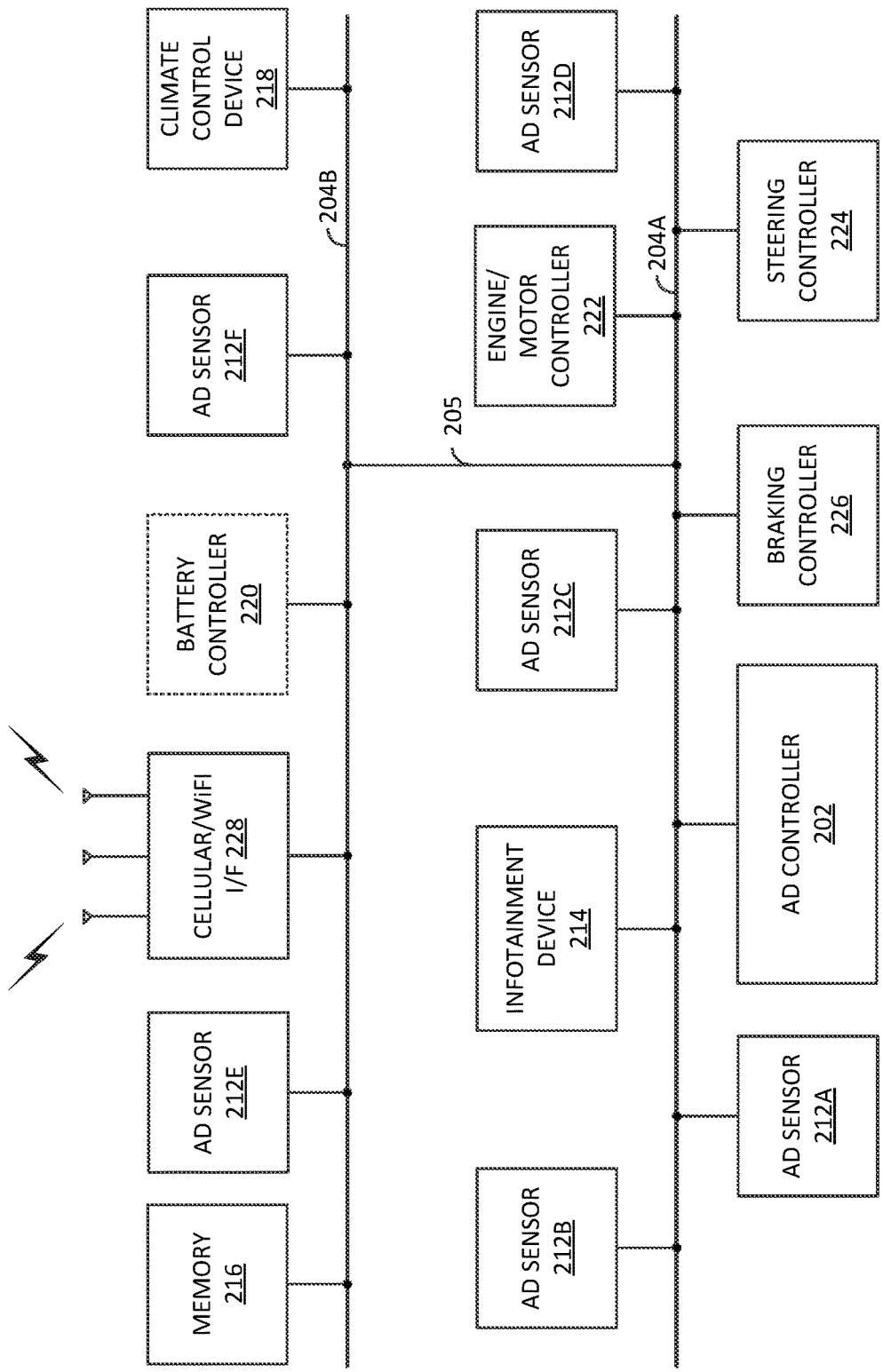
FIG. 2 is a block diagram illustrating an autonomous driving controller constructed and operating according to a first described embodiment.

FIG. 2 is a block diagram illustrating an autonomous driving system 200 constructed and operating according to a described embodiment. The autonomous driving system 200 includes a bus, an autonomous driving controller 108 coupled to the bus, and a plurality of autonomous driving sensors 212A-212F coupled to the bus. In the embodiment of FIG. 2, the bus includes two primary sections 204A and 204B intercoupled by section 205. The bus may be a twisted pair of conductors, a pair of strip conductors, a coaxial conductor, a two conductor power bus that carries DC power, or another structure having one or two conductors to support communications.

A plurality of devices communicates via the bus. These devices include the autonomous driving controller 108, the plurality of autonomous driving sensors 212A-212F, an infotainment device 214, memory 216, a climate control device 218, a battery controller 220 (when the vehicle is an electric vehicle or hybrid vehicle), an engine/motor controller 222, a steering controller 224, a braking controller 226, and a wireless interface 228 that includes multiple wireless interfaces, e.g., cellular, WiFi, Bluetooth, and/or other standards. The plurality of autonomous driving sensors 212A-212F may include one or more RADAR units, one or more LIDAR units, one or more cameras, and/or one or more proximity sensors. The plurality of autonomous driving sensors 212A-212F collect autonomous driving data and transmit the collected autonomous driving data to the autonomous driving controller 108 via the bus. The autonomous driving controller 108 then processes the data and, based on the processing, controls the driving of the vehicle, either fully or driver assisted, via controllers 222, 224, and 226.

FIG. 3A is a block diagram illustrating an autonomous driving sensor constructed according to a described embodiment. The autonomous driving sensor 300 includes data collection component 306 configured to collect autonomous driving data. The data collection component 306 may be a RADAR sensor, a LIDAR sensor, a sonic proximity sensor, or another type of sensor. The autonomous driving sensor 300 further includes processing circuitry 302, memory 304, and a transceiver 311 coupled to the processing circuitry 302, to the memory 304, and to the data collection component 306 via a bus. The processing circuitry 302 executes programs stored in memory 304, e.g., autonomous driving emergency operations, reads and writes data from/to memory, e.g., data and instructions to support autonomous driving operations, to interact with the data collection component 306 to control the collection of autonomous driving data, to process the autonomous driving data, and to interact with the transceiver 311 to communicate via the bus, among other operations.

By way of example and not limitation, processing circuitry 302 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, memory 304 may be dynamic memory, static memory, disk drive(s), flash drive(s), combinations of any of the foregoing, or any other form of computer memory. The memory 304 stores computer programs for operations of the present disclosure, may also store other computer programs, configuration information, and other short-term and long-term data necessary for implementation of the embodiments of the present disclosure.

The transceiver 311 includes a transmitter 308, a receiver 310, and a media I/F 312. The media I/F 312 may be a transmit/receive (T/R) switch, a duplexer, or other device that supports the illustrated coupling. In other embodiments, both the transmitter 308 and receiver 310 couple directly to the bus or couple to the bus other than via the media I/F 312. The transceiver 311 supports communications via the bus. The processing circuitry 302 and the transceiver 311 are configured to transmit autonomous driving data to the autonomous driving controller 108 on the bus.

FIG. 3B is a block diagram illustrating an autonomous driving controller constructed according to a described embodiment. The autonomous driving controller 108 includes general processing circuitry 352, memory 354, and a transceiver 361 coupled to the general processing circuitry 352 and configured to communicate with a plurality of autonomous driving sensors via the bus. The autonomous driving controller 108 also includes an autonomous driving parallel processing system 364 that operates on autonomous driving data received from the autonomous driving sensors and supports autonomous driving operations. The transceiver 361 includes a transmitter 358, a receiver 360, and a media I/F 362 that in combination support communications via the bus.

The construct of the general processing circuitry 352 may be similar to the construct of the processing circuitry 302 of the autonomous driving sensor 300. The autonomous driving parallel processing system 364 will be described further herein with reference to FIGS. 4-7. The memory 354 may be of similar structure as the memory 304 of the autonomous driving sensor 300 but with capacity as required to support the functions of the autonomous driving controller 108.

Figure 4A:
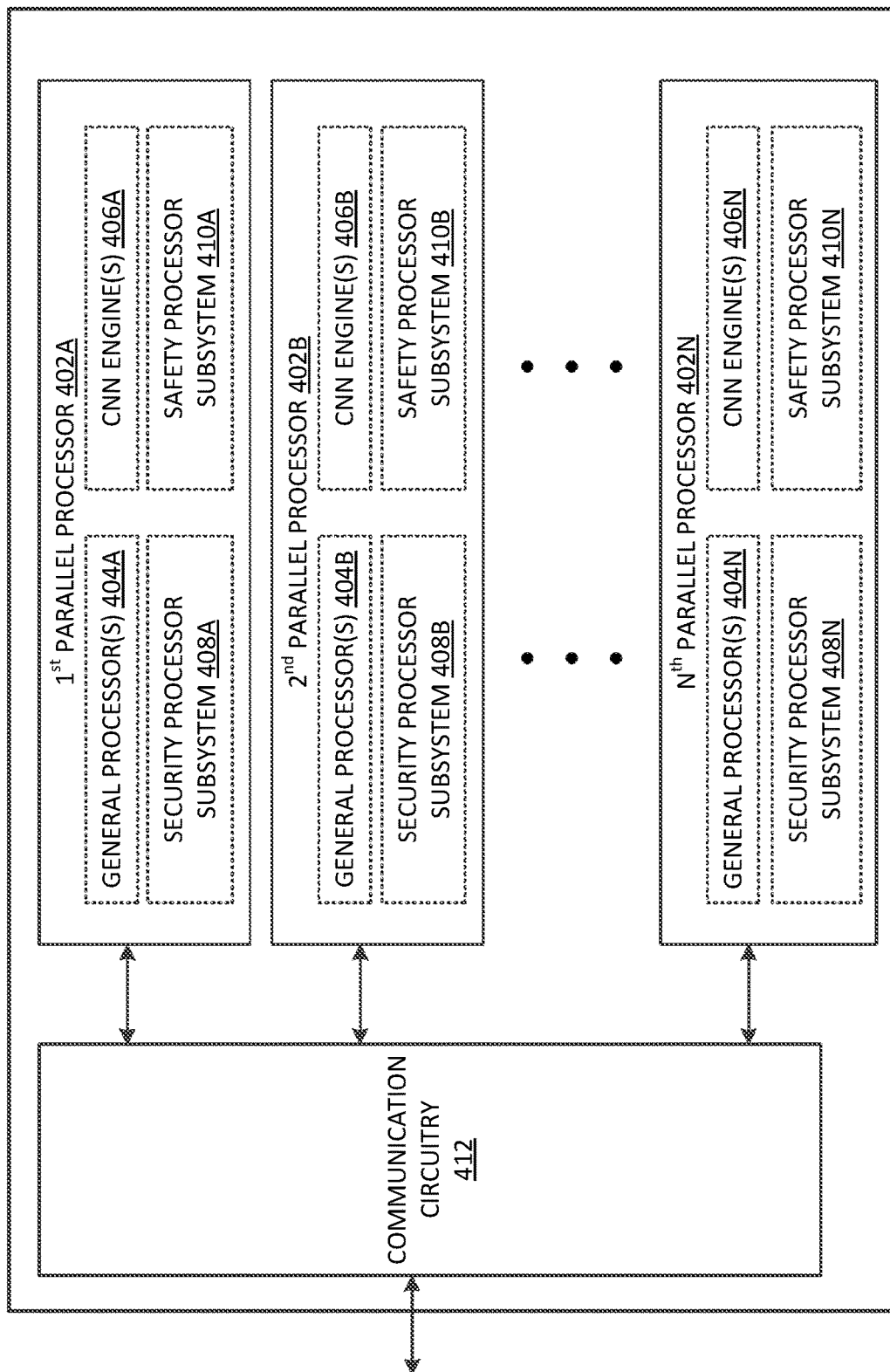
FIG. 4A is a block diagram illustrating a first embodiment of an autonomous driving parallel processing system constructed and operating according to the present disclosure.

FIG. 4A is a block diagram illustrating a first embodiment of an autonomous driving parallel processing system 400 constructed and operating according to the present disclosure. The parallel processing system 400 may be the parallel processing system 364 of FIG. 3B. Alternately, the parallel processing system 400 may be a separate construct that services the autonomous driving needs of a vehicle. The parallel processing system 400 includes a plurality of parallel processors 402A, 402B, . . . , 402N, operating on common input data received from the plurality of autonomous driving sensors 212A-212N. Each of the plurality of parallel processors 402A-402N includes a plurality of components, some of which but not all are illustrated in FIG. 4A. Communication circuitry 412 services communications among the plurality of parallel processors 402A-402N.

Further components not illustrated in FIG. 4A (and FIG. 4B) may include internal communication circuitry, e.g., Network on a Chip (NoC) communication circuitry, memory controllers, parallel processor General Interface Channel (GIC) circuitry, one or more network interfaces, Read Only Memory (ROM), e.g., system ROM and secure ROM, Random Access Memory (RAM), e.g., general RAM, cache memory RAM, and secure RAM, watchdog timers, and other communication interfaces, for example.

A first parallel processor 402A includes one or more general processors 404A, one or more Convolutional Neural Network (CNN) engines 406A, a Security Processor Subsystem (SCS) 408A, and a Safety Processor Subsystem (SMS) 410A. Likewise, a second parallel processor 402B includes one or more general processors 404B, one or more CNN engines 406B, a SCS 408B, and a SMS 410B. Finally, an Nth parallel processor 402N includes one or more general processors 404N, one or more CNN engines 406N, a SCS 408N, and a SMS 410N.

Generally, the SCSs 408A-408N are responsible for the security of the respective plurality of parallel processors 402A-402N. Security functions performed by the SCSs 408A-408N may include authorizing firmware updates, limiting access to memory, authorizing/deauthorizing rights of communication with components external to the plurality of parallel processors 402A-402N, and other security functions. The security operations may be performed as a group to secure the operation of the plurality of parallel processors 402A-402N, i.e., startup operations, reset operations, validating software/firmware updates, monitoring access of the plurality of parallel processors 402A-402N, etc. The group of SCSs 408A-408N may work together to first independently determine whether to authorize an operation and, second, make a group decision that requires agreement of all, or a subset of, SCSs 408A-408N before authorization is given.

The SMSs 410A-410C are responsible for the safety of autonomous driving by the autonomous driving controller. Because the plurality of parallel processors 402A-402N operate substantially on common input data and produce respective outputs, it is the role of the SMSs 410A-410N to determine whether the respective outputs of the parallel processors 402A-402N are in agreement, and if so, whether to authorize initiation or continuation of autonomous driving.

According the present disclosure, the components of the plurality of parallel processors are booted in a particular order. With this boot order, the plurality of SCSs 408A-408N are booted first, the plurality of SMSs 410A-410N are booted second, and the plurality of general processors 404A-404N are booted last. According to one aspect, the plurality of SCSs 408A-408N are booted with boot code that is retrieved from ROM that is dedicated to the SCSs 408A-408N and that may be only accessed by the SCSs 408A-408N. The plurality of SMSs 410A-410N are then booted with SMS boot code that is stored in flash RAM, that may be dedicated to the plurality of SMSs 410A-410N. The plurality of general processors 404A-404N are then booted with boot code that is stored in flash RAM, which may be general flash RAM.

According to another aspect of the present disclosure, the plurality of SCSs 408A-408N establish secure communications therebetween to, among other things, verify that they have booted correctly. To support these secure communications, the communication circuitry 412 is configured to support communications between the SCSs 408A-408N of the plurality of parallel processors 402A-402N that are protected by SCS cryptography. The communication circuitry 412 may also be configured to support communications between the SMSs 410A-410N of the plurality of parallel processors 402A-402N that protected by SMS cryptography, the SMS cryptography differing from the SCS cryptography. The secure communications among the plurality of SMSs 410A-410N may also be employed to ensure that the SMSs 410A-410N have booted correctly and to perform other safety operations.

The SCS and the SMS cryptography may be any number of differing cryptographies, e.g., public key cryptography, secret key cryptography, or hash key cryptography, for example. The reader will understand that the principles of the present disclosure may be accomplished using many differing types of cryptography. Because the structure and operation of differing cryptographies is generally known, these structures and operations will not be described further herein except as they relate to the principles and teachings of the present disclosure. The SCS and SMS cryptography (and other cryptography) described herein will be done with reference to public key cryptography in which an SCS private key is used to encrypt communications between the SCSs and in which an SMS private key is used to encrypt communications between the SMSs. Private key cryptography may also be used to protect communications between general processors 404A-404N of the plurality of parallel processors 402A-402N, between components of a vehicle 100A, between vehicles, e.g., between vehicle 100A and 100D, and between a vehicle, e.g., 100A and the autonomous driving server 16.

The SCS private key may be retrieved from a local memory dedicated to the first SCS 408A, e.g., ROM, or from the Resistor Transistor Logic (RTL) of the first SCS 408A. Alternately, the SCS private key may be generated by the first SCS 408A based upon data retrieved from local memory dedicated to the first SCS. Generation of the SCS private key or retrieval of the SCS private key may be performed by dedicated hardware of the first SCS 408A.

Likewise, the SMS private key may be retrieved from a local memory dedicated to the first SMS 410A, e.g., ROM or from the RTL of the first SMS 410A. Alternately, the SMS private key may be generated by the first SMS 410A based upon data retrieved from the local memory dedicated to the first SMS 410A. Generation of the SMS private key or retrieval of the SMS private key may be performed by dedicated hardware of the first SMS 410A.

According to an aspect of the present disclosure, the plurality of parallel processors 402A-402N may be configured such that a second SCS 408B is configured to store a SCS private key received from another SCS 408A in local memory dedicated to the SCS 408A. Likewise, a second SMS 410B may be configured to store a SMS private key received from another SMS 410A in local memory dedicated to the SMS 410B.

According to another aspect of the present disclosure, each of the plurality of parallel processors 402A-402N includes dedicated SCS cryptography hardware corresponding to their SCSs 408A-N. According to still another aspect of the present disclosure, each of the plurality of parallel processors 402A-402N includes dedicated SMS cryptography hardware corresponding to their SMSs 410A-410N.

According to a slightly different aspect, a first parallel processor 402A may include an SCS 408A that includes dedicated SCS memory and/or SCS cryptography hardware. In such case, the SCS 408A retrieves the SCS private key from its dedicated memory or generates the SCS private key and distributes the SCS private key to the other SCSs 408B-408N. In such case, one or more of the other SCSs 408-408N do not have dedicated SCS memory or SCS cryptography hardware. These same aspects may be applied to the SMSs 410A-410N of the plurality of parallel processors 402A-402N.

In establishing the SCS cryptography, a first SCS, e.g., 408A, of a first parallel processor 402A of the plurality of parallel processors 402A-402N may be configured to establish a private communication link with a second SCS 408B of a second parallel processor 402B of the plurality of parallel processors 402A-402N and use the private communication link to transmit a SCS private key to the second SCS 408B of the second parallel processor 402B for subsequent use in communications protected by the SCS cryptography. In establishing the private communication link with the second SCS 408B of the second parallel processor 402B of the plurality of parallel processors, the first SCS 408A of the first parallel processor 402A may use dedicated SCS cryptography hardware of the first SCS 408A and the second SCS 408B of the second parallel processor 402B may use dedicated SCS cryptography hardware of the second SCS 408B. In establishing the private communication link with the second SCS of the second parallel processor of the plurality of parallel processors, the first SCS may use one or more of the Diffie-Hellman algorithm and/or a Rivest-Shamir-Adleman (RSA) algorithm.

The autonomous driving parallel processing system 400 may have a number of differing physical constructs. According to one construct, the plurality of parallel processors 402A-402B is formed on a single System on a Chip integrated circuit (SOC). With this construct, the communication circuitry 412 may also be formed on the SOC. With another construct, the plurality of parallel processors is formed on differing respective integrated circuits. Further, with still another construct, a first group of the plurality of parallel processors 402A-402N is formed on a first integrated circuit and a second group of the plurality of parallel processors 402A-402N is formed on a second integrated circuit. Of course, other physical constructs may be formed without departing from the scope of the present disclosure.

According to another aspect of the present disclosure, the communication circuitry supports intra-vehicle communications among the plurality of autonomous driving sensors 212A-212N and the autonomous driving controller 202 using intra-vehicle cryptography that differs from the SCS cryptography and the SMS cryptography. Further, according to still another aspect of the present disclosure, wherein the communication circuitry supports extra-vehicle communications using extra-vehicle cryptography that differs from both the intra-vehicle cryptography and the SCS cryptography and the SMS cryptography.

Figure 4B:
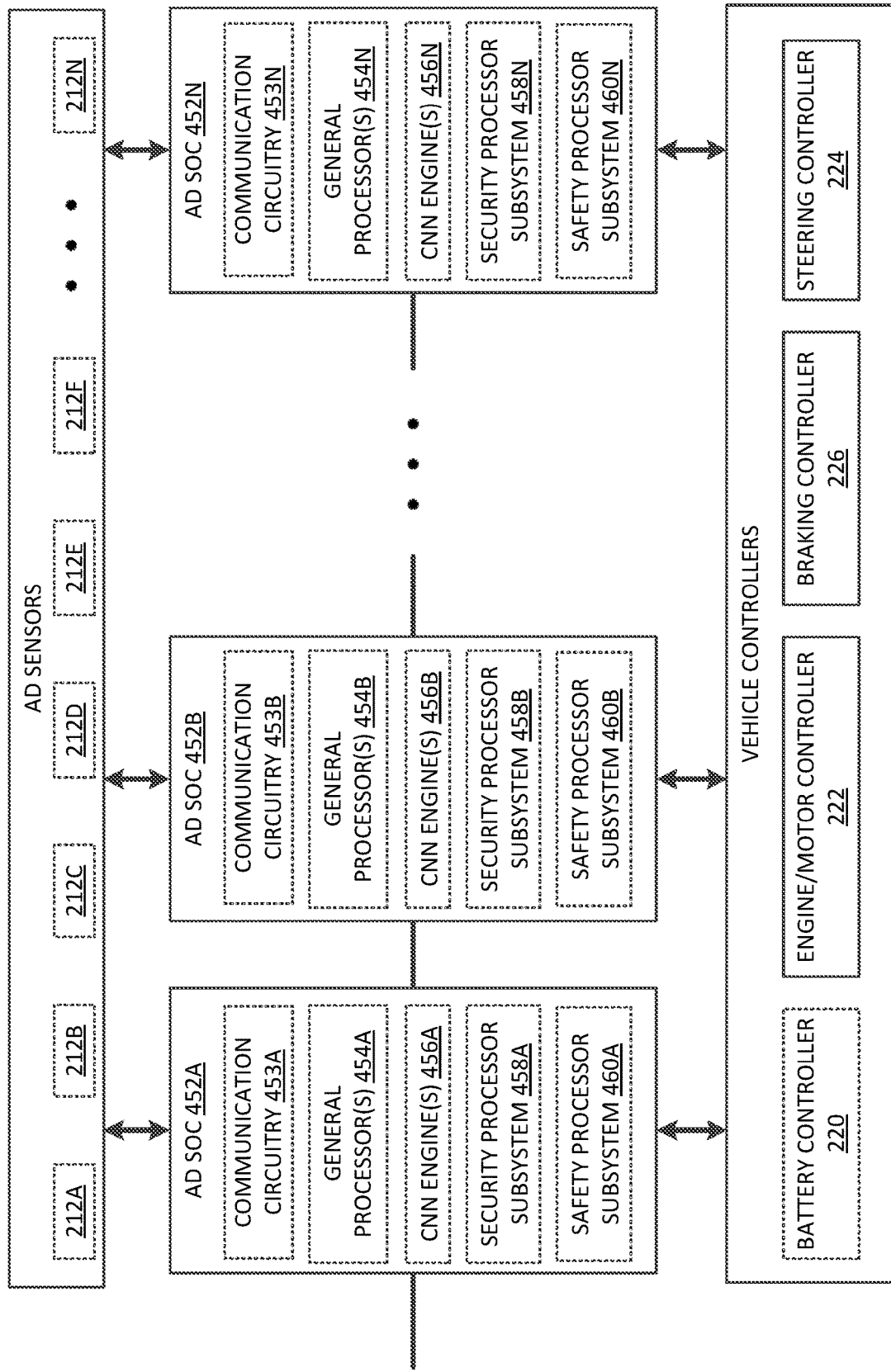
FIG. 4B is a block diagram illustrating a second embodiment of an autonomous driving parallel processing system constructed and operating according to the present disclosure.

FIG. 4B is a block diagram illustrating a second embodiment of an autonomous driving parallel processing system 450 constructed and operating according to the present disclosure. The autonomous driving parallel processing system 450 may be the autonomous driving parallel processing system 364 of FIG. 3B or may be a separate construct. As contrasted to the structure of FIG. 4A, the autonomous driving parallel processing system 450 of FIG. 4B includes a SOC for each parallel processor 452A-452N. Further, the communication circuitry 453A-453N resides, respectively, in the plurality of parallel processors 452A-452N. The parallel processing system may service all autonomous driving needs of a vehicle.

The parallel processing system 450 includes a plurality of parallel processors 452A, 452B, . . . , 452N, operating on common input data received from the plurality of autonomous driving sensors 212A-212N. The parallel processing system 450 also provides output data to vehicle controllers 220, 222, 226, and 224. This output data may be provided by agreement among the plurality of parallel processors 452A-452N or by a designated parallel processor of the plurality of parallel processors 452A-452N.

Each of the plurality of parallel processors 452A-452N may include components not illustrated in FIG. 4A and which may include internal communication circuitry, e.g., Network on a Chip (NoC) communication circuitry, memory controllers, parallel processor General Interface Channel (GIC) circuitry, one or more network interfaces, Read Only Memory (ROM), e.g., system ROM and secure ROM, Random Access Memory (RAM), e.g., general RAM, cache memory RAM, and secure RAM, watchdog timers, and other communication interfaces, for example.

A first parallel processor 452A includes communication circuitry 453A, one or more general processors 454A, one or more CNN engines 456A, a SCS 458A, and a SMS 460A. Likewise, a second parallel processor 452B includes communication circuitry 453B, one or more general processors 454B, one or more CNN engines 456B, a SCS 458B, and a SMS 460B. Finally, an Nth parallel processor 452N includes communication circuitry 453N, one or more general processors 454N, one or more CNN engines 456N, a SCS 458N, and a SMS 460N.

According the present disclosure, the components of the plurality of parallel processors are booted in a particular order. With this boot order, the plurality of SCSs 458A-458N are booted first, the plurality of SMSs 460A-460N are booted second, and the plurality of general processors 454A-454N are booted last. According to one aspect, the plurality of SCSs 458A-458N are booted with SCS boot code that is retrieved from ROM that is dedicated to the SCSs 458A-458N and that may be only accessed by the SCSs 458A-458N. The plurality of SMSs 460A-460N are then booted with boot code that is retrieved from flash RAM, that may be dedicated to the plurality of SMSs 460A-460N. The plurality of general processors are then booted with boot code that is retrieved from flash RAM, which may be general flash RAM.

According to another aspect of the present disclosure, the plurality of SCSs 458A-458N establish secure communications therebetween to, among other things, verify that they have booted correctly. To support these secure communications, the communication circuitry 453A-453N is configured to support communications between the SCSs 458A-458N of the plurality of parallel processors 452A-452N that are protected by SCS cryptography. The communication circuitry 453A-453N may also be configured to support communications between the SMSs 460A-460N of the plurality of parallel processors 452A-452N that protected by SMS cryptography, the SMS cryptography differing from the SCS cryptography. The secure communications among the plurality of SMSs 460A-460N may also be employed to ensure that the SMSs 460A-460N have booted correctly and to perform other safety operations.

According to another aspect of the present disclosure, the SCS cryptography is used to pass SMS boot code and/or general processor boot code from one SCS to another SCS. The SCS may then write the SMS boot code to SMS flash RAM and/or write the general processor boot code to general flash RAM.

The SCS and the SMS cryptography of the parallel processing system 450 of FIG. 4B may be similar to or the same as the SCS and SMS cryptography described with reference to FIG. 4A. Further, the particular structures and operations of the SCS and SMS of the parallel processing system 450 of FIG. 4B may be same or similar to those of FIG. 4A. Moreover, public key cryptography may also be used to protect communications between general processors 454A-454N of the plurality of parallel processors 452A-452N, between components of a vehicle 100A, between vehicles, e.g., between vehicle 100A and 100D, and between a vehicle, e.g., 100A and the autonomous driving server 16.

With the construct of FIG. 4B, the plurality of parallel processors 452A-452N are formed as a plurality of SOCs. According to another aspect of the present disclosure, the communication circuitry supports intra-vehicle communications among the plurality of autonomous driving sensors 212A-212N and the parallel processing system 450 using intra-vehicle cryptography that differs from the SCS cryptography. Further, according to still another aspect of the present disclosure, wherein the communication circuitry supports extra-vehicle communications using extra-vehicle cryptography that differs from both the intra-vehicle cryptography and the SCS cryptography.

Figure 5A:
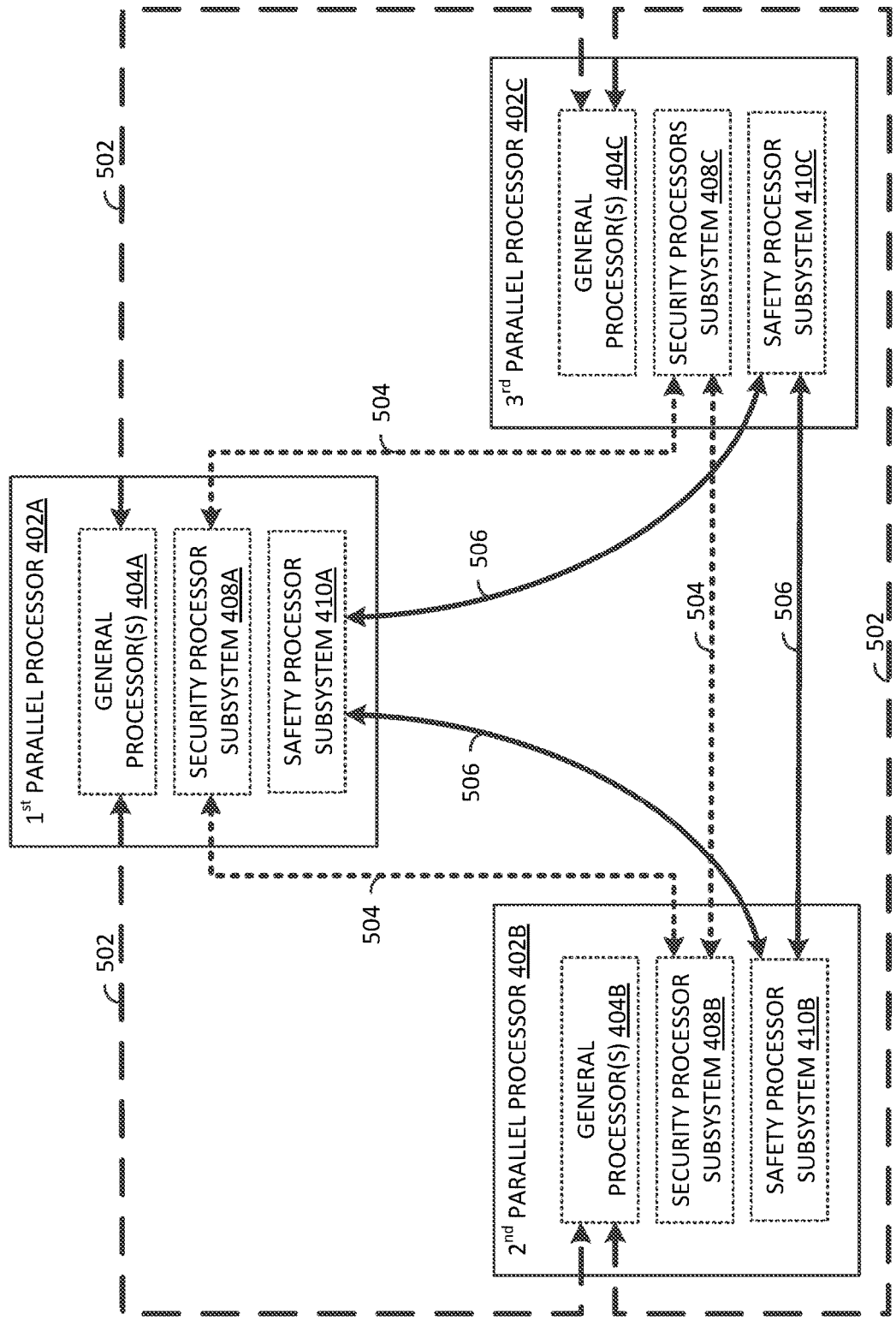
FIG. 5A is a block diagram illustrating communications among components of the autonomous driving parallel processors of FIGS. 4A and/or 4B.

FIG. 5A is a block diagram illustrating communications among components of the autonomous driving parallel processors of FIGS. 4A and/or 4B (400 and 450). Shown are three parallel processors 402A, 402B, and 402C that service communications among their general processors 404A-404C, among their SCSs 408A-408C, and among their SMSs 410A-410C in differing manners. From one viewpoint, different roots of trust are established between differing sets of components. A first root of trust is established among the general processors 404A, 404B, and 404C of the parallel processors 402A, 402B, and 402C. This root of trust among the general processors 404A, 404B, and 404C may be established so that communications therebetween are not encrypted. Alternately, the root of trust among the general processors 404A, 404B, and 404C may be established on a vehicle wide basis such that a shared public key/private key pair is used by all components within the vehicle to protect intra-vehicle communications, e.g., between the general processors 404A, 404B, and 404C and the autonomous driving sensors 212A-212N. The first root of trust is then used to support general processor communications 502 between the general processors 404A, 404B, and 404C.

Further, another root of trust is established among the SCSs 408A, 408B, and 408C that uses an SCS public/private key pair (SCS cryptography). The SCS private key (and SCS public key) may be hard wired, e.g., ROM or RTL, in one of the SCSs 408A, 408B, or 408C. The SCS private key is then distributed among the other SCSs 408B and 408C of the parallel processing system, which is subsequently used for all SCS communications 504 between the SCSs 408A-408C.

Additionally, another root of trust is established among the SMSs 410A, 410B, and 410C that uses an SMS public/private key pair that is different from the SCS public/private key pair (SMS cryptography). The SMS private key (and SMS public key) may be hard wired, e.g., ROM or RTL, in one of the SMSs 410A, 410B, or 410C. The SMS private key is then distributed among the other SMSs 410B and 410C of the parallel processing system, which is subsequently used for all SMS communications 506 between the SMSs 410A-410C.

The same or differing encryption types may be used for the differing roots of trust. For example, a weak encryption may be used for the general processor communications 502 with stronger encryption used for the SCS communications 504 and the SMS communications 506. Further, with some aspects, a strongest encryption is used for the SCS communications 504 because the SCSs are the most secure components of the parallel processing system.

With the plurality of SCSs 408A-408C booting first, they may be enabled to establish their root of trust and the corresponding SCS cryptography before either the SMSs 410A-410C or the general processors 404A-404C have been booted. Thus, after the SCSs 408A-408C have been booted, but prior to the booting of the SMSs 410A-410C, the SCSs 408A-408C may communicate using the SCS cryptography to verify that they have correctly booted. Such verification may be a simple process, such as exchanging a particular SCS state or a more complex verification process that requires multiple communications among the plurality of SCSs 408A-408C. After booting of the SMSs 410A-410C, the SMSs 410A-410C may use communications that are SMS encrypted to verify that they have correctly booted as well.

Figure 5B:
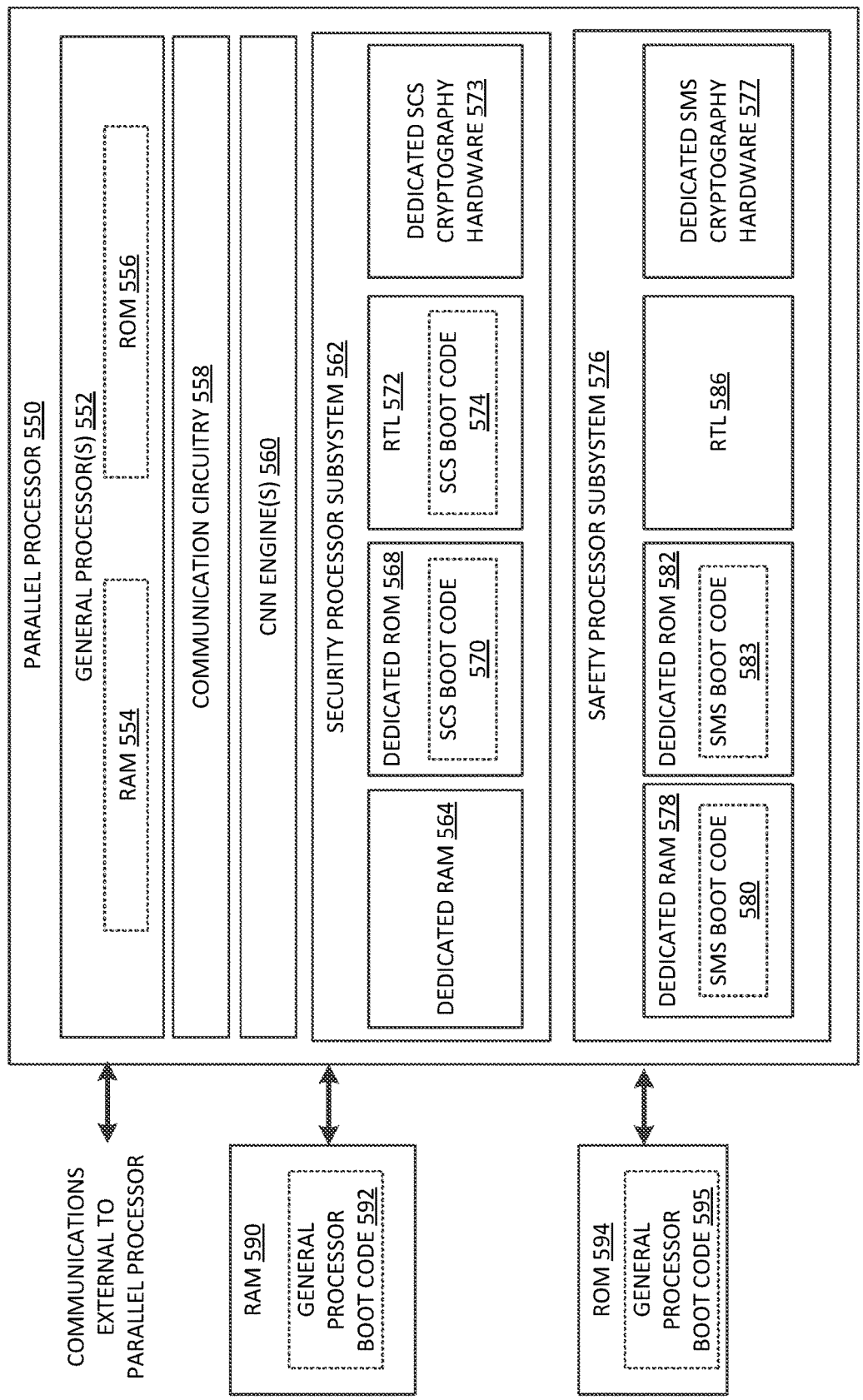
FIG. 5B is a block diagram illustrating components of a parallel processor of the autonomous driving parallel processors of FIGS. 4A and/or 4B according to one or more aspects of the described embodiments.

FIG. 5B is a block diagram illustrating components of a parallel processor of the autonomous driving parallel processors of FIGS. 4A and/or 4B according to one or more aspects of the described embodiments. A parallel processor 550 includes one or more general processors 552, communication circuitry 558, one or more CNN engines 560, a SCS 562, and a SMS 576. The general processors include local RAM 554 and local ROM 556. The communication circuitry 558 is configured to support communications between the parallel processor 550 and other parallel processors and between the parallel processor 550 and other components external to the parallel processor 550. RAM 590 services the parallel processor 550 and stores data that may include public/private keys and general processor boot code 592. ROM 594 services the parallel processor 550 and stores data that may include public/private keys and/or general processor boot code 595.

The parallel processor 550 further includes CNN engine(s) 560, a SCS 562 and a SMS 576. The SCS 562 includes dedicated RAM 564 that may be used to store public/private keys. Further, the SCS 562 further includes dedicated ROM 568 and RTL 572 that may store public/private keys or SCS boot code 570 and 574, respectively. The SCS 562 may further include dedicated SCS cryptography hardware 573 that supports SCS cryptography operations according to the present disclosure, and which may include key generation, communication encryption, and communication decryption operations.

Likewise, the SMS 576 further includes dedicated RAM 578 that may be used to store SMS boot code 580. Further, the SMS 576 further includes dedicated ROM 582 that may store SMS boot code 583, and RTL 586 that may store public/private keys. The RTL 572 and 586 are hard programmed during manufacture of the parallel processor 550 and the ROM 568 and 582 may be programmed during provisioning of the parallel processor 550. The SMS 576 may further include dedicated SMS cryptography hardware 577 that supports the SMS cryptography operations according to the present disclosure, and which may include key generation, communication encryption, and communication decryption operations.

According to the present disclosure, the general processor 552, the SCS 562, and the SMS 576 are configured to first, boot the SCS from ROM 568 using the SCS boot code 570, second, to boot the SMS 576 using the SMS boot code 580 stored in the RAM 578 that is dedicated to the SMS 576, and, third, boot the general processor(s) 552 from RAM 590 using the general processor boot code 592. Alternately, the SMS 576 may boot from the ROM 582 dedicated to the SMS using the SMS boot code 583.

According to an optional aspect, the SCS 562 is configured to, after it has booted and prior to the booting of the SMS 576, write the SMS boot code 580 to the RAM 578 dedicated to the SMS 576. According to another optional aspect, after the booting of the SCS 562 and prior to the booting of the SMS 576, the SCS 562 operates to establish SCS encrypted communications with at least one other SCS and verify with the at least one other SCS, that it and the at least other SCS has successfully booted. Likewise, after the booting of the SMS 576 and prior to the booting of the general processor 552, the SMS 576 operates to establish SCS encrypted communications with at least one other SMS and verify with the at least one other SMS, that it and the at least other SMS has successfully booted.

The parallel processor 550 supports SCS and the SMS cryptography that may be same/similar as the SCS and SMS cryptography described with reference to FIGS. 4A, 4B and 5A. Further, the parallel processor 550 also supports general processor 552 communications as were previously described herein with reference to other structure(s).

Consistent with the previously described operations, the SCS private key may be retrieved from the ROM 568 or the RTL 572. Alternately, the SCS private key may be generated by the SCS 562 based upon data retrieved from the ROM 568 or RTL 572. Generation of the SCS private key or retrieval of the SCS private key may be performed by dedicated hardware 573 of the SCS 562.

Likewise, the SMS private key may be retrieved from the ROM 582 or the RTL 586. Alternately, the SMS private key may be generated by the SMS 576 based upon data retrieved from the ROM 582 or RTL 586. Generation of the SMS private key or retrieval of the SMS private key may be performed by dedicated SMS cryptography hardware 577, of the SMS 576.

Figure 6:
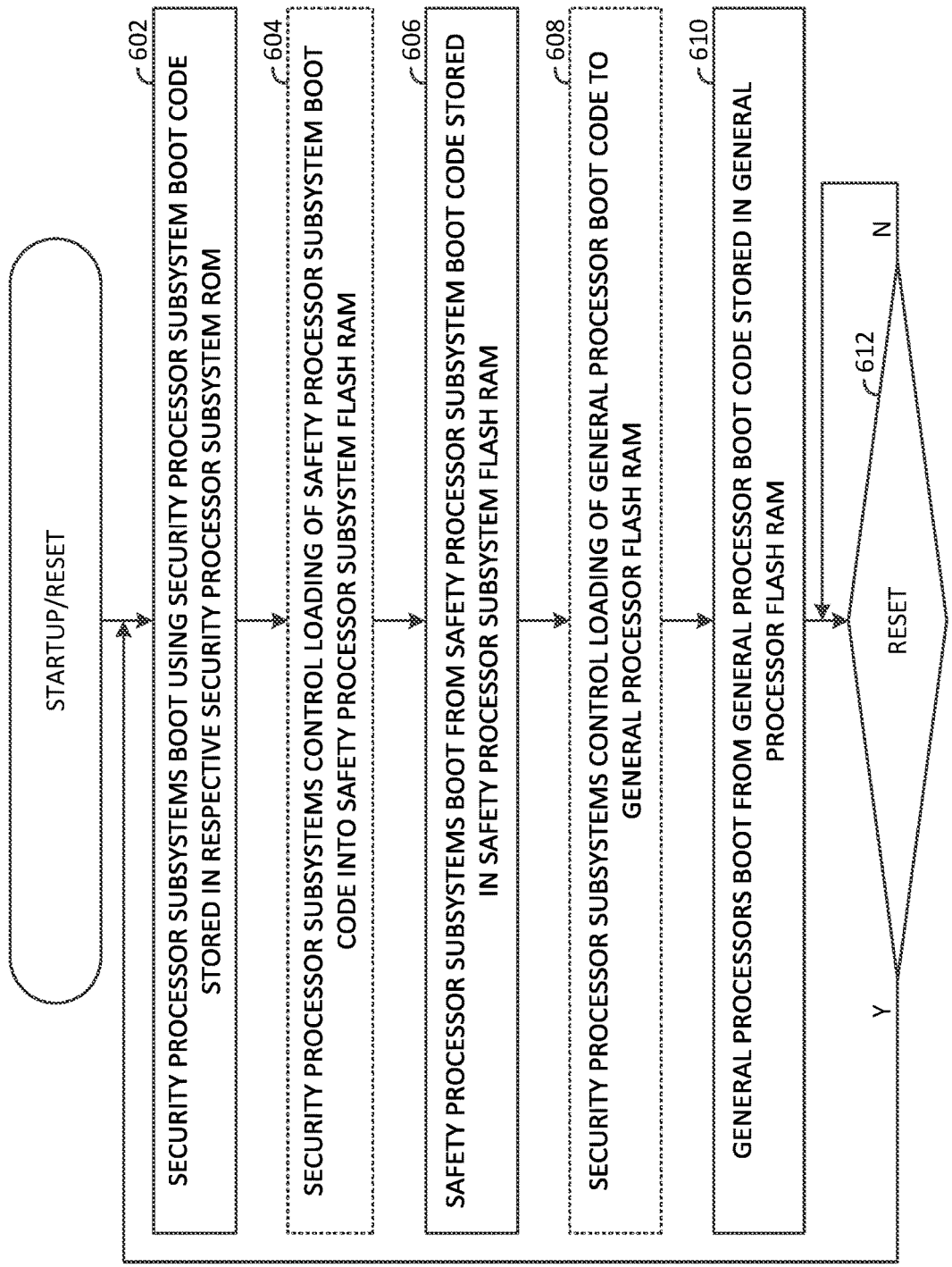
FIG. 6 is a flow diagram illustrating operations of an autonomous driving controller at startup or reset according to one or more described embodiments.

FIG. 6 is a flow diagram illustrating operations of an autonomous driving controller at startup or reset according to one or more described embodiments. Operations 600 at startup or reset begin with first, booting a plurality of SCSs of a plurality of parallel processors using SCS boot code stored in ROM dedicated to the plurality of SCSs (step 602). Next, operations 600 continue with the SCSs optionally controlling loading of SMS boot code into SMS flash RAM (step 604). Next, operations 600 continue with booting the plurality of SMSs of the plurality of parallel processors using SMS boot code stored in the SMS flash RAM (step 606). In an alternate operation, the SMS boot code is stored in ROM and the SMSs boot using the SMS code stored in the ROM. Next, operations 600 continue with the SCSs optionally controlling loading of general processor boot code into general processor flash RAM (step 608). Then, operations 600 continue with booting the plurality of general processors of the plurality of parallel processors (step 610). The plurality of parallel processors is then fully enabled and operational until there is a reset event (at step 612) and, upon reset, operations 600 return to step 602.

Figure 7:
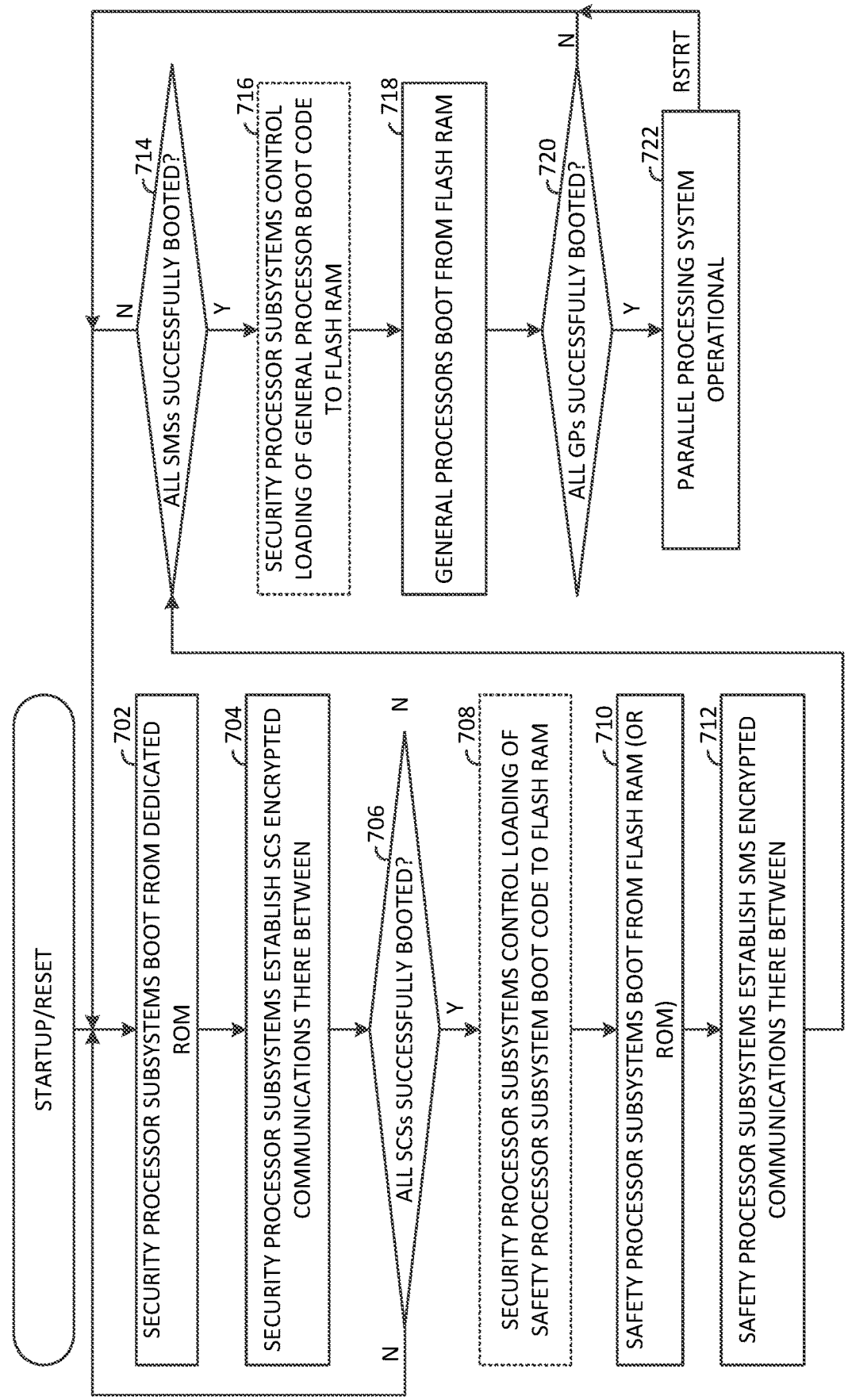
FIG. 7 is a flow diagram illustrating other operations of an autonomous driving controller at startup or reset according to one or more described embodiments.

FIG. 7 is a flow diagram illustrating other operations of an autonomous driving controller at startup or reset according to one or more described embodiments. Operations 700 at startup or reset begin with first, booting a plurality of SCSs of a plurality of parallel processors from ROM dedicated to the plurality of SCSs (step 702). Operations 700 continue with the SCSs establishing SCS encrypted communications therebetween (step 704). The SCSs then determine whether all of the SCSs have successfully booted (step 706). If not, operation returns to step 702. If so, one or more SCSs optionally control loading of SMS boot code into SMS flash RAM (step 708).

Next, operations 700 continue with booting the plurality of SMSs of the plurality of parallel processors from SMS boot code stored in the SMS flash RAM (step 710). In an alternate operation, the SMS boot code is stored in ROM and the SMSs boot from the SMS code stored in the ROM. Operations 700 continue with the SMSs establishing SMS encrypted communications therebetween (step 712). The SMSs then determine whether all of the SMSs have successfully booted (step 714). If not, operation returns to step 702. If so, one or more SCSs optionally control loading of general processor boot code into general processor flash RAM (step 716).

Then, operations 700 continue with booting the plurality of general processors of the plurality of parallel processors (step 718). The general processors then determine whether all of the general processors have successfully booted (step 720). If not, operation returns to step 702. If so, the plurality of parallel processors is then fully enabled and operational until there is a reset event (at step 722) and, upon reset, operations 700 return to step 702.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed system, method, and computer program product. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Routines, methods, steps, operations, or portions thereof described herein may be implemented through electronics, e.g., one or more processors, using software and firmware instructions. A "processor" or "processing circuitry" includes any hardware system, hardware mechanism or hardware component that processes data, signals or other information. A processor can include a system with a central processing unit, multiple processing units, dedicated circuitry for achieving functionality, or other systems. Some embodiments may be implemented by using software programming or code in one or more digital computers or processors, by using application specific integrated circuits (ASICs), programmable logic devices, field programmable gate arrays (FPGAs), optical, chemical, biological, quantum or nano-engineered systems, components and mechanisms. Based on the disclosure and teachings representatively provided herein, a person skilled in the art will appreciate other ways or methods to implement the invention.

As used herein, the terms "comprises," "comprising," "includes," "including," "has," "having" or any contextual variants thereof, are intended to cover a non-exclusive inclusion. For example, a process, product, article, or apparatus that comprises a list of elements is not necessarily limited to only those elements, but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, reversed, or otherwise controlled by another process.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A method for booting an autonomous driving controller that includes a plurality of parallel processors, the method comprising:
   first, booting a plurality of security processor subsystems (SCSs) of the plurality of parallel processors from Read Only Memory (ROM) dedicated to the plurality of SCSs;
   second, booting a plurality of safety processor subsystems (SMSs) of the plurality of parallel processors; and
   third, booting a plurality of general processors of the plurality of parallel processors,
   wherein after the booting of the plurality of SCSs and prior to the booting of the plurality of SMSs:
      establishing SCS encrypted communications among the plurality of SCSs; and
      at least one SCS verifying successful booting of the plurality of SCSs using the SCS encrypted communications,
   or wherein after the booting of the plurality of SMSs and prior to the booting of the plurality of general processors:
      establishing SMS encrypted communications among the plurality of SMSs; and
      at least one SMS verifying successful booting of the plurality of SMSs using the SMS encrypted communications.

2. The method of claim 1, wherein booting the plurality of SMSs of the plurality of parallel processors comprises booting the plurality of SMSs from ROM dedicated to the plurality of SMS s.

3. The method of claim 1, wherein booting the plurality of SMSs of the plurality of parallel processors comprises booting the plurality of SMSs from flash Random Access Memory (RAM) dedicated to the plurality of SMSs.

4. The method of claim 3, further comprising, after the booting of the plurality of SCSs and prior to the booting of the plurality of SMSs, at least one SCS controlling loading of SMS boot code to the RAM dedicated to the plurality of SMSs.

5. A method for booting an autonomous driving controller that includes a plurality of parallel processors, the method comprising:
   first, booting a plurality of security processor subsystems (SCSs) of the plurality of parallel processors from Read Only Memory (ROM) dedicated to the plurality of SCSs;
   second, the plurality of SCSs of the plurality of parallel processors controlling loading of safety processor subsystem (SMS) boot code into Random Access Memory (RAM) dedicated to a plurality of SMSs of the plurality of parallel processors; and
   third, booting the plurality of SMSs of the plurality of parallel processors with the SMS boot code stored in the RAM dedicated to the plurality of SMSs; and
   fourth, booting a plurality of general processors of the plurality of parallel processors,
   wherein after the booting of the plurality of SCSs and prior to the booting of the plurality of SMSs:
      establishing SCS encrypted communications among the plurality of SCSs; and
      at least one SCS verifying successful booting of the plurality of SCSs using the SCS encrypted communications,
   or wherein the SMSs are configured to, further comprising, after the booting of the plurality of SMSs and prior to the booting of the plurality of general processors:
      establishing SMS encrypted communications among the plurality of SMSs; and
      at least one SMS verifying successful booting of the plurality of SMSs using the SMS encrypted communications.

6. An autonomous driving controller for a vehicular autonomous driving system that has a plurality of autonomous driving sensors, the autonomous driving controller comprising:
   a plurality of parallel processors operating on common input data received from the plurality of autonomous driving sensors, the plurality of parallel processors including, respectively:
      a plurality of general processors;
      a plurality of security processor subsystems (SCSs); and
      a plurality of safety subsystems (SMSs), wherein the plurality of general processors, the plurality of SCSs, and the plurality of SMSs are configured to:
   first, boot the plurality of SCSs from Read Only Memory (ROM) dedicated to the plurality of SCSs;
   second, boot the plurality of SMSs; and
   third, boot the plurality of general processors,
   wherein the plurality of general processors, the plurality of SCSs, and the plurality of SMSs are configured to:
      after the booting of the plurality of SCSs and prior to the booting of the plurality of SMSs:
         establish SCS encrypted communications among the plurality of SCSs; and
         verify, by at least one SCS, successful booting of the plurality of SCSs using the SCS encrypted communications, or after the booting of the plurality of SMSs and prior to the booting of the plurality of general processors:
    establish SMS encrypted communications among the plurality of SMSs; and
    verify, by at least one SMS, successful booting of the plurality of SMSs using the SMS encrypted communications.

7. The autonomous driving controller of claim 6, wherein the plurality of general processors, the plurality of SCSs, and the plurality of SMSs are configured to boot the plurality of SMSs from ROM dedicated to the plurality of SMSs.

8. The autonomous driving controller of claim 6, wherein the plurality of general processors, the plurality of SCSs, and the plurality of SMSs are configured to boot the plurality of SMSs from flash Random Access Memory (RAM) dedicated to the plurality of SMSs.

9. The autonomous driving controller of claim 8, wherein the plurality of general processors, the plurality of SCSs, and the plurality of SMSs are configured to, after the booting of the plurality of SCSs and prior to the booting of the plurality of SMSs, at least one SCS writing an SMS boot code to the RAM dedicated to the plurality of SMSs.

10. An autonomous driving controller for a vehicular autonomous driving system that has a plurality of autonomous driving sensors, the autonomous driving controller comprising:
    a plurality of parallel processors operating on common input data received from the plurality of autonomous driving sensors, the plurality of parallel processors including, respectively:
        a plurality of general processors;
        a plurality of security processor subsystems (SCSs); and
        a plurality of safety subsystems (SMSs), wherein the plurality of general processors, the plurality of SCSs, and the plurality of SMSs are configured to:
    first, boot the plurality of SCSs from Read Only Memory (ROM) dedicated to the plurality of SCSs;
    second, cause the plurality of SCSs to load SMS boot code into Random Access Memory (RAM) dedicated to a plurality of SMSs; and
    third, boot the plurality of SMSs of the plurality of parallel processors with the SMS boot code stored in the RAM dedicated to the plurality of SMSs; and
    fourth, boot the plurality of general processors of the plurality of parallel processors,
    wherein the plurality of general processors, the plurality of SCSs, and the plurality of SMSs are configured to:
        after the booting of the plurality of SCSs and prior to the booting of the plurality of SMSs:
            establish SCS encrypted communications among the plurality of SCSs; and
            verify, by at least one SCS, successful booting of the plurality of SCSs using the SCS encrypted communications,
        or after the booting of the plurality of SMSs and prior to the booting of the plurality of general processors:
            establish SMS encrypted communications among the plurality of SMSs; and
            verify, by at least one SMS, successful booting of the plurality of SMSs using the SMS encrypted communications.

* * * * *